UNITED STATES PATENT OFFICE 2,097,339

RESINOUS COMPOSITION

Gordon Derby Patterson and Richard Stanley Shutt, Wilmington, Del., assignors to E. I. du Pont de Nemours & Company, Wilmington, Del., a corporation of Delaware No Drawing. Application April 17, 1934, Serial No. 721,068

13 Claims. (Cl. 134—26)

This invention relates to improved coating compositions, and relates more particularly to paints which do not exhibit mold growth.

The development of mold on exposed paint films is a very common occurrence, although this has not been generally recognized. It is well known that high grade paints, including white, red, green, buff and other colors are sometimes subject to what, in the past, has been commonly termed unusually severe dirt collection. In recent years it has been proved that this supposed "dirt collection" is often mold growth.

Dark green paint used on shutters and trim of houses, particularly in shady spots, often turns black from mold growth. Barn paints of the iron oxide type often become badly discolored from mold growth, particularly near the ground. White paints that are subject to mold growth generally assume a dirty gray appearance as the mold structure develops. Further, mold has been known to attack paints with a resultant softening effect on the film. Such disfiguration, and sometimes softening, seriously diminishes the period of useful life of paint films, which is dependent upon maintenance of pleasing appearance and protection of the painted surface. Other common paints which are known to mold under certain conditions are: freight car paints, white lead-in-oil paints, distempers and water paints, and art paintings. Special types, such as wood oil and polyhydric alcohol-polycarboxylic acid resin paints, are also now known to exhibit mold growth.

It should be pointed out that all discoloration of paint films is not mold growth. At certain stages of the growth of mold on paint films, the appearance of mold and dirt is practically identical to the naked eye or at low magnification. At this stage of growth, distinction can be made only by means of high magnification or actual propagation of mold on sterile paint films or culture media by direct inoculation with the discoloring material (containing mold spores) from exposed paint films.

Nothing much has been done concerning this discoloration of paint films, because it has not been generally appreciated, until recently, that it is due in many cases to mold growth. Mercury compounds, among them organic mercurials, have been suggested previously as having an inhibiting effect on mold growth. They have not been used, however, due to toxicity to human beings, with resultant danger in handling and in application—and due to lack of permanence in the film over a period of years. The present invention is concerned with the solution of this problem.

We have discovered after extensive research that, among all the organic mercurials, there is a particular narrow class which is unusually effective and practical as a mold inhibitor for paint films. This group of mercurials can be defined generally as being of the formula R—Hg—X, in which R is a monovalent aromatic hydrocarbon radical and X is OH or the radical of an inorganic or organic acid. The invention is preferably carried out with compounds of the formula $C_6H_5$—Hg—X but the phenyl group may be replaced by o-, p-, or m-tolyl or mixtures thereof, xylyl, cumenyl, cymyl, p-ethylphenyl, 2-mesityl, alpha or beta naphthyl, p-benzylphenyl, p-phenylphenyl, etc., or by any aromatic hydrocarbon radical, e. g. an aryl group which consists of a monovalent aromatic hydrocarbon radical having its free valence directly attached to a ring (aromatic) carbon atom. It has not been known heretofore that any of the mercurials in this class were effective as mold inhibitors in any system whatever. The compounds in this class present an unusual combination of properties which make them practical and exceptionally valuable for use as mold inhibitors in paint: (1) They are efficient mold inhibitors at low concentrations, therefore small quantities only are required for effectiveness in paint films. (2) As a class, these compounds are much less toxic to human beings than ordinary mercury compounds. (3) They lack volatility in coating compositions and maintain their effectiveness under the severe conditions of outdoor exposure including light, heat, and moisture. (4) They have no harmful effects on film properties of coating compositions.

This invention has as an object the production of paints which are resistant to mold growth. A further object is the production of paints which yield films of improved flexibility retention and which are at the same time resistant to mold growth. Other objects will appear hereinafter.

These objects are accomplished by the introduction of the organic mercurials defined above into coating compositions generally and especially into those paints whose useful life is considerably decreased by the presence of other agents which prevent mold growth, but which, at the same time, adversely affect the flexibility retention and durability.

More specifically, the objects of the invention are accomplished by formulating the coating composition with a suitable pigment, a suitable vehicle, and the mercurial, the composition preferably being free from zinc oxide and similarly functioning mold inhibiting materials since the latter induce film embrittlement and otherwise adversely affect the properties of the film.

With the above and other objects in view, which will be apparent as the description proceeds, we have set forth our invention in the following specification and have included the following examples of coating compositions embodying our invention by way of illustration and not as a limitation:

EXAMPLE I

Green shutter paint

|   | Parts |
|---|---|
| Chrome green | 38.50 |
| Barytes | 66.00 |
| Asbestine | 56.50 |
| Linseed oil | 100.00 |
| Phenylmercuric chloride | 0.78 |
| Drier solution (lead, manganese linoleates) | 6.00 |
| Thinner | 4.00 |
|   | 271.78 |

The phenylmercuric chloride in the above example is present in an amount of 0.3% based on film solids.

A paint prepared from phthalic anhydride-linseed oil acids-glycerol resin (described hereinafter as resin A) containing the same pigments as in Example I is also definitely improved by the use of the present mercurials.

EXAMPLE II

Flat wall paint

|   | Parts |
|---|---|
| Lithopone | 246.00 |
| Asbestine | 95.00 |
| Refined linseed oil | 13.60 |
| Long oil (China-wood, linseed) varnish | 100.00 |
| Phenylmercuric oleate | 2.27 |
| Mineral spirits | 56.00 |
|   | 512.87 |

The phenylmercuric oleate in Example II corresponds to 0.5% based on film solids.

EXAMPLE III

Lead-oil paint

|   | Parts |
|---|---|
| White lead-linseed oil paste | 356.00 |
| Raw linseed oil | 100.00 |
| Phenylmercuric nitrate | 2.28 |
| Turpentine | 3.60 |
| Paste drier | 4.60 |
|   | 466.48 |

The phenylmercuric nitrate in Example III corresponds to 0.5% based on film solids.

EXAMPLE IV

Iron oxide barn paint

|   | Parts |
|---|---|
| Iron oxides | 37.00 |
| China clay | 50.00 |
| Linseed oil | 100.00 |
| Phenylmercuric acetate | 0.94 |
| Drier solution (lead manganese) | 16.00 |
| Mineral spirits | 9.50 |
|   | 213.44 |

The phenylmercuric acetate in Example IV corresponds to 0.5% based on film solids.

EXAMPLE V

Water paint

|   | Parts |
|---|---|
| Calcium carbonate | 530.00 |
| China clay | 108.00 |
| Casein | 100.00 |
| Phenylmercuric chloride | 2.28 |
| Soda ash | 23.00 |
| Water | 1000.00 |
|   | 1763.28 |

The phenylmercuric chloride in Example V corresponds to 0.3% based on film solids.

Besides the above mentioned distinct advantages of films obtained from paints containing these types of organic mercurials, there are special cases where paints of exceptional film properties may be made practical by proper formulation and by concurrent incorporation of the present mold-preventive agents.

A valuable special application of the present invention is the production of improved China-wood oil paints. It has been the common practice to formulate exterior white paints with zinc oxide and drying oils consisting wholly or in part of oils such as linseed oil. The zinc oxide is a valuable ingredient in these drying oil compositions because of the valuable properties conferred to the film. In addition to increasing the rate of drying, hardening the film, and preventing its early erosion by rapid chalking, zinc oxide also inhibits the growth of disfiguring black or colored mold.

We have found, however, that wood oil paints are distinguished from the paints made from other drying oils in that the wood oil paints are improved markedly, not only in flexibility but also in durability when they are free from zinc oxide and like compounds which have been used to prevent mold growth. While these zinc-free wood oil paints are thus improved as to flexible life their value is seriously diminished because of the growth of mold which takes place on the film upon exposure to the weather. Thus, through this appreciation of the fact that zinc oxide, which as explained above is conventionally used in paints to obtain improved film properties in addition to mold inhibition, has in fact undesirable effects on China-wood oil films, we are enabled through incorporation of our new agents into zinc-free China-wood oil compositions to produce durable China-wood oil films which possess the requisite properties of both mold resistance and flexibility. Through the use of titanium pigment as given in the following example, mold resisting China-wood oil paint films are obtained which possess unusual flexibility and durability and are free from the defects of lessened distensibility, and increased tendency towards checking-cracking and blister-peeling.

EXAMPLE VI

Wood oil paint

|   | Parts |
|---|---|
| Barium base titanium pigment | 185.00 |
| Heat-treated China-wood oil | 100.00 |
| Phenylmercuric chloride | 1.43 |
| Metallic cobalt added in drier solution | .03 |
| Mineral spirits | 50.00 |
|   | 336.46 |

The phenylmercuric chloride in Example VI corresponds to 0.5% based on film solids.

Another special application of the present invention is illustrated in the following examples and consists in the formulation of polyhydric alcohol-polycarboxylic acid resin coating compositions which yield mold-resisting films of unusual flexibility as compared to previous compositions of this kind containing mold inhibitors. It is to be understood, however, that no claims are made to compositions comprising these synthetic resins except in conjunction with the new mold-inhibiting agents disclosed herein inasmuch as the improved compositions comprising organic mercurials generally in polyhydric alcohol-polycarboxylic acid resin coating compositions are disclosed and claimed in co-pending application Serial No. 721,069 filed of even date herewith.

EXAMPLE VII

| | Parts |
|---|---|
| Barium base titanium pigment | 143.00 |
| Asbestine | 16.60 |
| Polyhydric alcohol-polycarboxylic acid resin A | 100.00 |
| Phenylmercuric hydroxide | 0.52 |
| Drier solution (lead, manganese, cobalt linoleates) | 4.80 |
| Thinner | 75.00 |
| | 339.92 |

The phenylmercuric hydroxide in this composition was used in an amount corresponding to 0.2% of the film solids.

Resin A in the above composition was prepared from the following ingredients by heating at 200–250° C. until an acid number of 4–6 is reached:

| | Parts |
|---|---|
| Phthalic anhydride | 27.09 |
| Glycerol | 17.11 |
| Linseed oil acids | 55.80 |
| | 100.00 |

EXAMPLE VIII

| | Parts |
|---|---|
| Barium base titanium pigment | 153.90 |
| Antimony oxide | 17.10 |
| Polyhydric alcohol-polycarboxylic acid resin A | 100.00 |
| Phenylmercuric acetate | 0.81 |
| Drier solution (lead, manganese, cobalt linoleates) | 4.00 |
| Thinner | 62.00 |
| | 337.81 |

The phenylmercuric acetate in Example VIII corresponds to 0.3% based on film solids. Experience suggests 0.3% as an optimum quantity for maximum effectiveness with minimum agent.

In carrying out the invention, the mercurial is added as a rule to the mill base and the latter ground by any of the usual methods such as by ball mill, colloid mill, buhrstone, roller mill and the like. Where the mercury compound is already in finely divided form it can be added directly by efficient mixing or stirring either to the previously ground mill base, or to the finished paint or at any intermediate stage in the operation. It is often desirable to grind the mercury compound in part of the thinner in which event the addition can be made when desired. Or, it may be added as a powder, in the form of a suspension in water or in organic liquids, or in the form of solutions. The latter may by reaction or deposition in the paint medium yield the mercury compound in situ. The pigment may also be treated with the mercurial prior to incorporation into the vehicle.

Effective quantities of the mercurial vary from 0.01–2.0%, the best amount depending on the particular mercurial chosen and other factors. In most cases, 0.01–0.2% is adequate although certain of the compounds are added in somewhat higher amounts, that is, from 0.5% to 2%. This may also be necessary in certain localities where mold growing conditions are particularly severe. In general, it is desirable to use compounds which are relatively non-volatile in order that they may not slowly volatilize from the film and thus reduce its effectiveness. It is usually desirable to employ compounds which are relatively insoluble in water especially under conditions where the films will be continuously exposed to wet weather. Also, in general, it is desirable to employ compounds which are relatively non-toxic toward man as, for instance, phenylmercuric nitrate.

As previously pointed out, the mercury compounds herein referred to are contained within the group having the general structure R—Hg—X, where R is a monovalent aromatic hydrocarbon radical and X is OH or an acid radical. The compounds particularly valuable for the purposes of this invention are those in which the organic radical is unsubstituted as well as being an aromatic hydrocarbon radical, as for instance compounds of the formula $C_6H_5$—Hg—X. X may be for example: hydroxyl, chloride, sulfate, arsenate, bromide, iodide, cyanide, nitrate, phosphate, oleate, benzoate, salicylate, thiosalicylate, cyanate, thiocyanate, propionate, acetate, butyrate, decanoate, stearate, $\alpha$-naphthionate, etc. Among the phenylmercuric compounds that may be employed to best advantage are the following: (1) Phenylmercuric acetate because it may be prepared at low cost. (2) Phenylmercuric hydroxide, phenylmercuric chloride, and phenylmercuric nitrate, which are less toxic to human beings than ordinary mercury compounds. (3) Phenylmercuric oleate which is oil-soluble.

In order to obtain the optimum results in durability and flexibility retention, the special coating composition vehicles and organic mercury compound described herein should be used in conjunction with an inert pigment such as titanium pigment exemplified by titanium oxide. The calcium or barium base titanium pigments are especially suitable. When it is desired to retard the rate of chalking, antimony trioxide is included, in conjunction with inert extenders and colored pigments. Pigments other than the titanium pigment referred to in the examples are satisfactory for some purposes. Such pigments are lithopone, zinc sulfide, antimony oxide, chrome yellow, chrome green, Prussian blue, carbon black and other similar pigments as well as extender materials such as talc, whiting, barytes, silica, asbestine, China clay, and the like.

The term "coating composition" as used herein, refers generally to all types of coating compositions including vehicles such as drying oils; natural resins; synthetic resins; cellulosic materials including nitrocellulose, cellulose acetate, cellulose propionate, cellulose butyrate, crotyl cellulose, ethyl cellulose, benzyl cellulose, etc.; distempers or water paints. For example, distemper may contain water-soluble or water-dispersible binders such as casein, glue, starch, water-glass, oil-water emulsions, etc. This classification includes house paints, flat wall paints, marine paints, enamels, lacquers, shingle stains, stucco stains, etc.

While our preferred agents are particularly useful in coating compositions they are also valuable and useful in shaped or molded compositions, utilizing continuous and semi-continuous binders, which are essentially organic in nature. For example, our products are suitable for use in cast or molded plastic materials such as from polyhydric alcohol-polycarboxylic acid resins, vinyl resins, urea-aldehyde resins, phenol-aldehyde resins, natural resins, cellulose materials including esters and ethers, polymerized oils, rubber, synthetic rubber, etc., with or without fillers such as talc, asbestos, clay, mica, gypsum, wood flour, carbon black, titanium dioxide, etc.

By "plastic materials" is meant resins, polymerized oils, cellulose materials, natural rubber and synthetic rubbers.

The present products are useful in clear, as well as pigmented finishes, where it is necessary to prevent mold growth. Their high effectiveness in low concentrations make them particularly valuable in clear finishes because they have minimum effect on the clarity of the system.

Thus, it is apparent that, through this invention, it is possible not only to inhibit mold growth in common paints and molded structures, but also, through selected pigment systems, to improve markedly special compositions such as are herein referred to. The particular advantages of mercurials of the class defined herein in comparison with other mercurials and other agents heretofore considered as mold inhibitors for paint are: (1) Effectiveness at low concentrations. (2) Low toxicity to human beings. (3) Maintenance of effectiveness under exposure conditions. (4) Lack of harmful effect on film properties.

As many apparently widely different embodiments of this invention may be made without departing from the spirit and scope thereof, it is to be understood that we do not limit ourselves to the specific embodiments thereof except as defined in the appended claims.

We claim:

1. A coating composition comprising a vehicle subject to disfiguring mold growth in the film, and a small amount of a compound of the formula R—Hg—X, where R is a monovalent aromatic hydrocarbon radical and X is selected from the class consisting of hydroxyl and monobasic acid radicals, said composition yielding films of low toxicity which are highly resistant to mold growth.

2. The coating composition set forth in claim 1 in which R is $C_6H_5$—.

3. The coating composition set forth in claim 1 in which said vehicle is a drying oil.

4. A coating composition comprising China-wood oil, a zinc oxide-free pigment system, and a small amount of a compound of the formula R—Hg—X, where R is a monovalent aromatic hydrocarbon radical and X is selected from the class consisting of hydroxyl and monobasic acid radicals, said composition yielding films of low toxicity which are highly resistant to mold growth.

5. The coating composition set forth in claim 1 in which said vehicle is a resinous polyhydric alcohol mixed ester of a polycarboxylic acid and drying oil acids.

6. A coating composition comprising a resinous polyhydric alcohol mixed ester of a polycarboxylic acid and drying oil acids subject to mold growth in the film, a zinc oxide-free pigment system, and a small amount of a compound of the formula R—Hg—X, where R is a monovalent aromatic hydrocarbon radical and X is selected from the class consisting of hydroxyl and monobasic acid radicals, said composition yielding films of low toxicity which are highly resistant to mold growth.

7. The coating composition set forth in claim 1 in which said vehicle comprises a film-forming polyhydric alcohol ester of drying oil acids.

8. A coating composition comprising a film-forming polyhydric alcohol ester of drying oil acids subject to mold growth in the film, a pigment system comprising a titanium pigment, and a small amount of a compound of the formula R—Hg—X, where R is a monovalent aromatic hydrocarbon radical and X is selected from the class consisting of hydroxyl and monobasic acid radicals, said composition yielding films of low toxicity which are highly resistant to mold growth.

9. The coating composition set forth in claim 8 in which said pigment system in a zinc oxide-free pigment system comprising titanium pigment.

10. The coating composition set forth in claim 8 in which said pigment system is a zinc oxide-free pigment system comprising titanium pigment and an antimony pigment.

11. The coating composition set forth in claim 1 in which the compound of said formula is phenyl mercuric hydroxide.

12. The coating composition set forth in claim 1 in which the compound of said formula is phenyl mercuric acetate.

13. The coating composition set forth in claim 1 in which the compound of said formula is phenyl mercuric nitrate.

GORDON DERBY PATTERSON.
RICHARD STANLEY SHUTT.